United States Patent [19]
Mizutani et al.

[11] Patent Number: 5,531,885
[45] Date of Patent: Jul. 2, 1996

[54] HYDROCONVERSION PROCESS FOR HEAVY HYDROCARBON OIL

[75] Inventors: Yoshihiro Mizutani; Takeshi Tomino; Yasuo Yamamoto; Yukio Shibata; Hatsutaro Yamazaki, all of Saitama, Japan

[73] Assignees: Cosmo Oil Co., Ltd.; Cosmo Research Institute, both of Tokyo, Japan

[21] Appl. No.: 388,999

[22] Filed: Feb. 15, 1995

[30] Foreign Application Priority Data

Feb. 19, 1994 [JP] Japan .................... 6-044920

[51] Int. Cl.$^6$ .................................. C10G 65/02
[52] U.S. Cl. .................. 208/210; 208/209; 208/211; 208/212
[58] Field of Search .................... 208/210, 211, 208/212

[56] References Cited

U.S. PATENT DOCUMENTS

| | | | |
|---|---|---|---|
| 3,437,588 | 4/1969 | Kovach et al. | 208/216 |
| 3,492,220 | 1/1970 | Lempert | 208/210 |
| 3,696,027 | 1/1970 | Bridge | 208/210 |
| 3,728,249 | 4/1973 | Antezana | 208/210 |
| 3,730,879 | 5/1973 | Christman | 208/210 |
| 3,766,058 | 10/1973 | Hensly, Jr. | 208/210 |
| 3,977,961 | 8/1976 | Hamner | 208/210 |
| 4,016,067 | 4/1977 | Fischer et al. | 208/210 |
| 4,019,976 | 4/1977 | Cosyns et al. | 208/210 |
| 4,048,060 | 9/1977 | Riley | 208/210 |
| 4,212,729 | 7/1980 | Hensley, Jr. et al. | 208/210 |
| 4,404,097 | 9/1983 | Angevine | 208/210 |
| 4,421,633 | 12/1983 | Shih et al. | 208/210 |
| 4,431,525 | 2/1984 | Hensley et al. | 208/210 |
| 4,657,663 | 4/1987 | Gardner et al. | 208/210 |
| 4,789,462 | 12/1988 | Byrne et al. | 208/210 |
| 5,344,553 | 9/1994 | Shih | 208/210 |

*Primary Examiner*—Helane Myers
*Attorney, Agent, or Firm*—Sughrue, Mion, Zinn, Macpeak & Seas

[57] ABSTRACT

Disclosed is a process for hydroconverting a heavy hydrocarbon oil in a reactor under high-temperature and high-pressure conditions, wherein said hydroconversion is carried out through using at least three desulfurization catalysts which each contains as active metals transition metals of Group VI and VIII in the Periodic Table supported on an alumina carrier and which have different SI of 40 or higher, 30 or higher and below 40, and lower than 30, respectively, and wherein said at least three catalysts are packed into the reactor in a descending order of SI from the inlet to the outlet of the reactor, with the proportion of the catalyst having SI of 40 or higher is at least 10% by volume, that of the catalyst having SI of 30 or higher and below 40 is at least 20% by volume, and that of the catalyst having SI of lower than 30 is at least 30% by volume.

5 Claims, 6 Drawing Sheets

HYDROCONVERSION PROCESS FOR HEAVY HYDROCARBON OIL

FIELD OF THE INVENTION

The present invention relates to a process for the hydroconversion (e.g., hydrodesulfurization, hydrocracking, and hydrodemetallization) of a heavy hydrocarbon oil containing sulfur, asphaltene, and heavy metals (e.g., nickel and vanadium).

BACKGROUND OF THE INVENTION

The demand for low-sulfur heavy fuel oils is greatly increasing in recent years from the standpoint of preventing air pollution.

On the other hand, with the worldwide trend toward production of heavier crude oils, it tends to become necessary to treat heavy crude oils containing large amounts of sulfur, asphaltene, heavy metals, etc. As a result, the operation conditions of hydroconversion units at which heavy oils, e.g., atmospheric distillation residues and vacuum distillation residues, are hydrodesulfurized to low-sulfur heavy fuel oils are becoming more severe.

Moreover, since the supply of middle distillates such as kerosene and gas oil has long been insufficient for the demand therefor, the operation conditions of hydroconversion units at which heavy oils are hydrocracked are also becoming more severe.

Under such circumstances, investigations are intensively being made on the enhancement of the activity of hydroconversion catalysts and on the prolongation of the life thereof for the purpose of increasing the production of low-sulfur heavy fuel oils through the hydroconversion of heavy oils.

Also desired is the establishment of a hydrocracking technique for obtaining, with good selectivity, middle distillates of satisfactory quality from residual oils.

Hitherto, reports on processes for the hydrodesulfurization of heavy oils, e.g., atmospheric distillation residues and vacuum distillation residues, have been made by a large number of researchers.

Among these, there are a series of reports on a successive catalytic process for hydroconverting a heavy hydrocarbon oil. The processes disclosed therein employ a combination of catalysts arranged in multistage catalyst beds so as to effectively conduct the hydrodesulfurization and hydrodemetallization of a heavy hydrocarbon oil. In these processes, the heavy hydrocarbon oil is continuously hydroconverted under high-pressure conditions without partly separating the reaction products yielded in each catalyst bed.

For example, U.S. Pat. No. 4,016,067 discloses the use of a catalyst having a pore diameter of from 100 to 200 Å in the first stage and a catalyst having a pore diameter of from 30 to 100 Å in the second stage.

U.S. Pat. No. 4,019,976 discloses a process in which two catalysts are used for the first and second beds, respectively, with the catalyst for the second bed being made to have a higher activity in the intended reaction than the catalyst for the first bed by changing the amount of the active metal components.

U.S. Pat. No. 3,437,588 describes a process in which two or more hydroconversion catalysts having different activities are used, which catalysts are each supported on a carrier having a pore diameter of from 20 to 100 Å.

U.S. Pat. No. 3,977,961 describes a so-called two-stage catalyst system comprising a catalyst having a pore diameter of from 100 to 275 Å which is disposed in the first stage and a catalyst having a pore diameter of from 100 to 200 Å which is disposed in the second stage.

U.S. Pat. No. 3,696,027 describes a hydrodesulfurization process using classified catalysts including a catalyst having a macropore diameter (larger than 500 Å).

The above prior art processes employ a down-flow type reactor packed in an upper part thereof with a catalyst having a high large-pore content and in a lower part thereof with a catalyst having a low large-pore content.

U.S. Pat. No. 3,535,225 discloses a two-stage hydrocracking process in which either or both of an alumina catalyst and a silica-alumina catalyst are used in the first stage and a zeolite catalyst is used in the second stage.

U.S. Pat. No. 3,385,781 discloses a two-stage hydrocracking process in which a zeolite having a large pore diameter is used in the first stage and a zeolite having a small pore diameter is used in the second stage.

U.S. Pat. Nos. 3,730,879, 3,766,058, and 4,048,060 describe a two-stage catalyst system in which the catalyst used in the second stage has a larger pore diameter than the catalyst used in the first stage.

In processes for the hydroconversion of heavy oils using conventional multi-stage catalyst combinations, the catalysts to be used in combination are classified according to only one factor selected from physical properties such as pore size distribution, average pore diameter, the contents of active metals, the kind of the zeolite contained, etc., as in the prior art processes described above.

However, such catalyst systems have some problems concerning the deactivation stability of the catalysts used in combination. It is therefore difficult to consistently maintain a high charge rate and a high degree of hydrocracking.

For example, if a catalyst combination is improperly designed with respect to a physical property such as pore volume, pore size distribution, or pore diameter, the catalyst system has poor deactivation stability even though the initial desulfurization activity thereof is high, resulting in a gradual decrease in the degree of hydrocracking during the latter half of operation.

In the case of a silica-alumina or zeolite catalyst, a high degree of hydrocracking is obtained initially, but this performance cannot be maintained over a relatively long time because such catalysts have poor deactivation stability.

SUMMARY OF THE INVENTION

An object of the present invention is to provide a process for processing a heavy hydrocarbon oil containing sulfur, asphaltene, and heavy metals such as nickel and vanadium using a catalyst system in which hydrodesulfurization activity has been enhanced synergistically with a technique different from the conventional hydrodesulfurization techniques described above, to thereby efficiently produce middle distillates while maintaining a high desulfurization activity and a high degree of hydrocracking in a high-temperature region for a long period.

The essential aspect of the present invention resides in a process for hydroconverting a heavy hydrocarbon oil in a reactor under high temperature and high pressure conditions, said hydroconversion being carried out through using at least three desulfurization catalysts which each contain as active components transition metals of Group VI and VIII in the Periodic Table supported on an alumina carrier and which have a different "Stability Index" (hereinafter simply referred to as "SI") of 40 or higher, 30 or higher and below 40, and lower than 30, respectively, said at least three catalysts being packed into the reactor in a descending order of SI from the inlet to the outlet of the reactor, with the proportion of the catalyst having a SI of 40 or higher being at least 10% by volume, that of the catalyst having a SI of 30 or higher and below 40 being at least 20% by volume, and that of the catalyst having a SI of lower than 30 being at least 30% by volume.

In the above process of the present invention, the proportion by volume, V (%), of the catalyst having a SI of 40 or higher is preferably in the range defined by the equation:

$$10(0.63X-56)Y/3-10 < V < 10(0.63X-56)Y/3+10$$

where X is the partial pressure (kg/cm²G) of the hydrogen fed for the reaction and Y is the sulfur content (wt %) of the product oil.

DETAILED DESCRIPTION OF THE INVENTION

Figure 1:
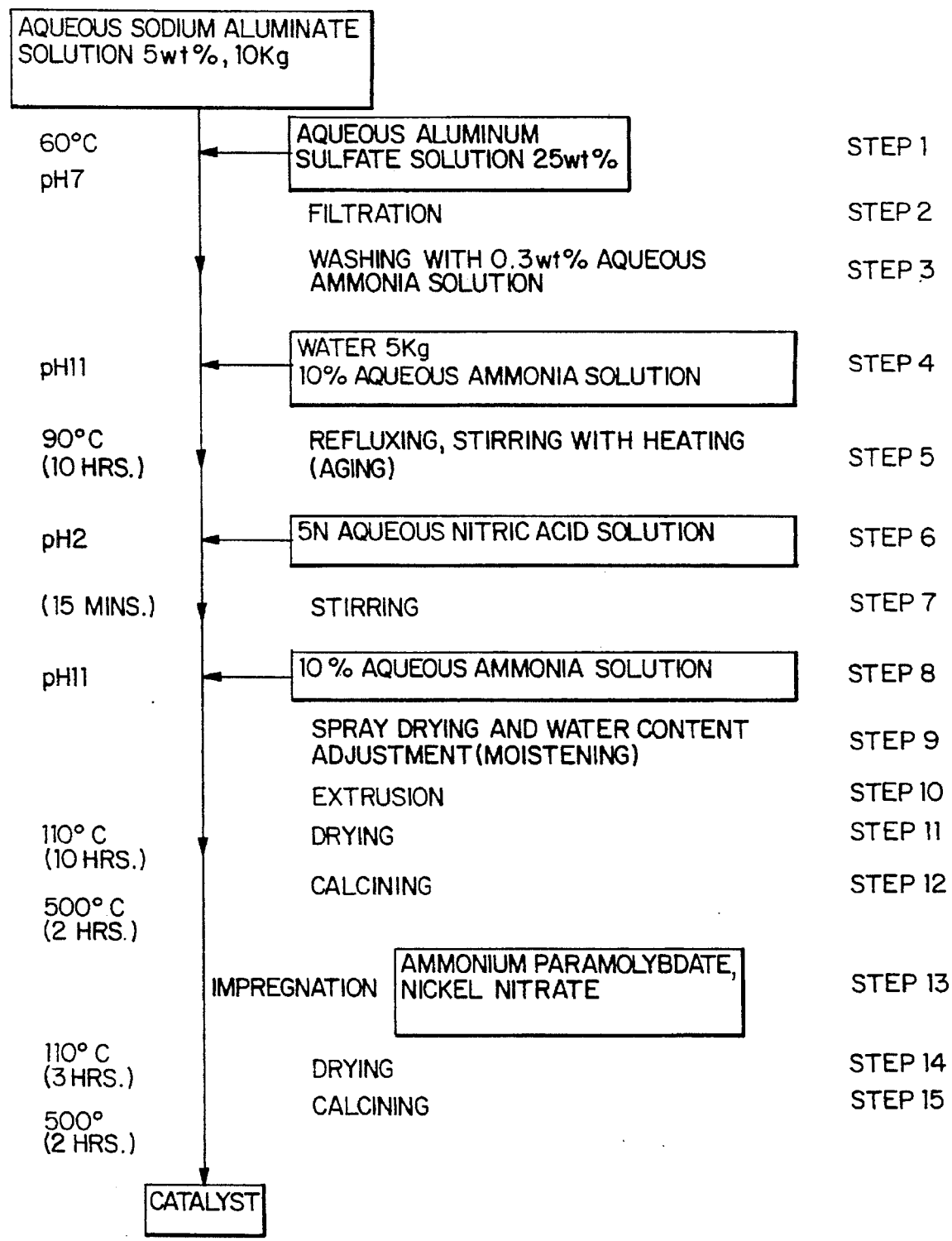
FIG. 1 is a flow chart showing the steps for preparing a catalyst used in Examples of the present invention.

The transition metals of Group VI and VIII in the Periodic Table which can be used as active metal components of the catalysts in the present invention as an example include molybdenum, tungsten, chromium, cobalt, nickel, and iron.

It is preferred in the present invention that the catalyst having a SI of 40 or higher contains a combination of nickel and molybdenum as active metals and the catalyst having a SI of lower than 40 contains as active metals any of a combination of nickel, cobalt, and molybdenum, a combination of nickel and molybdenum, and a combination of cobalt and molybdenum, and that the catalysts be packed so that the cobalt/nickel weight ratio in the whole catalyst system is from 0 to 2 in terms of the ratio of cobalt oxide/nickel oxide.

It is also preferred in the present invention that the catalysts having a SI of lower than 40 are packed in such a manner that in the packed catalysts, the cobalt/nickel weight ratio in any catalyst is not higher than that of the adjacent catalyst disposed on the side toward the outlet of the reactor.

The term "SI" used herein means the amount of vanadium and nickel which has deposited on the catalyst at the time when the degree of desulfurization has decreased to 20% in hydroconverting an ultra-heavy hydrocarbon oil containing sulfur, nickel, and vanadium at high concentrations under high-temperature and high-pressure conditions in the presence of hydrogen, that amount of the deposited vanadium and nickel being determined in terms of wt % based on the amount of the fresh catalyst.

The term "degree of desulfurization" used above means the percentage of the difference in sulfur contents between feedstock oil and product oil to the sulfur content of feedstock oil.

Thus, SI is a factor concerning the tendency of the catalyst to deactivate, which factor is inherent in the catalyst.

The range of SI generally expands with the development of new catalysts, but is usually from 2 to 100.

The SI of a catalyst can be determined through hydroconverting an ultra-heavy hydrocarbon oil containing sulfur, nickel, and vanadium at high concentrations in a reactor packed with the catalyst at a high temperature in the presence of high-pressure hydrogen at a constant LHSV (liquid hourly space velocity), measuring the amount of the metals which have accumulated on the catalyst, and calculating the SI from the measured metal amount.

The ultra-heavy hydrocarbon oil for the above use includes crude oils and vacuum distillation residues, but use of Boscan crude is preferred from the standpoint of obtaining the desired value of SI in a short period of time.

Specifically, the measurement of the SI is made under conditions of a reaction temperature of 395±1° C., a hydrogen partial pressure of 105±2 kg/cm²G, an LHSV of 0.5±0.01 h⁻¹, and a hydrogen/oil ratio of 1,780±50 NL/L ("NL" means normal liter and "L" means liter; the same applies hereinafter).

As the reaction period increases, the activity of the catalyst gradually decreases through deactivation and the degree of desulfurization, i.e., the percentage of the difference in sulfur contents between feedstock oil and product oil to the sulfur content of feedstock oil, decreases.

The amounts of nickel and vanadium which have accumulated on the catalyst can be calculated by measuring the amount of nickel and vanadium contained in the product oil and comparing this amount with the amount of the nickel and vanadium contained in the feedstock oil.

The amounts (wt %) of vanadium and nickel which have accumulated on the catalyst at the time when the degree of desulfurization has decreased to 20% is taken as the SI.

If only a catalyst having a SI of 40 or higher and a catalyst having a SI of lower than 30 are used in combination, it is impossible to obtain a catalyst system having sufficient desulfurization and hydrocracking activities with consistency. In addition to these catalysts, the use of a catalyst having an intermediate SI of 30 or higher and below 40 is necessary.

Use of a catalyst system consisting of a combination of only a catalyst having a SI of 30 or higher and below 40 and a catalyst having a SI of lower than 30 has a disadvantage that even though the catalyst system may have high desulfurization activity in the initial stage of the reaction, it fails to consistently maintain good desulfurization activity during the middle stage of the reaction, so that long-term operation at a high charge rate is impossible. Another disadvantage of such a catalyst system is that the hydrocracking activity thereof is insufficient even in the initial stage of the reaction.

Furthermore, use of a catalyst system consisting of a combination of only a catalyst having a SI of 40 or higher and a catalyst having a SI of 30 or higher and below 40 is defective in that this catalyst system is insufficient in both desulfurization activity and hydrocracking activity and hence long term operation at a high charge rate is impossible.

Accordingly, catalysts are classified according to SI into three groups, i.e., a first group having a SI of 40 or higher (preferably 40 or higher and not higher than 70), a second group having a SI of 30 or higher and below 40, and a third group having a SI of index lower than 30 (preferably 3 or higher and below 30). At least three catalysts (i.e., a catalyst having a SI of 40 or higher, a catalyst having a SI of 30 or higher and below 40, and a catalyst having a SI of lower than 30) are packed and used in a reactor in a given proportion in a descending order of SI. Thus, a catalyst combination system for hydroconversion can be constituted which consistently exhibits not only high desulfurization activity but also high hydrocracking activity due to the synergistic effect of these three catalysts.

In this catalyst combination system according to the present invention, hydrocracking activity has some correlations with desulfurization activity, and the catalyst system which has consistent desulfurization activity also shows good hydrocracking activity for the operating period.

In this catalyst combination, the proportion of the catalyst having a SI of 40 or higher to be used (packed) is at least 10% by volume and preferably in the range of $10(0.63X-56)Y/3\pm10\%$.

The reason for the use of the catalyst having a SI of 40 or higher in an amount of 10% by volume or larger is as follows. If the proportion of this catalyst is below 10% by volume, the catalyst system fails to consistently maintain good desulfurization activity in the latter stage of the reaction, which finally reduces catalyst life and the average degree of hydrocracking.

The upper limit of the packing proportion of this catalyst is not particularly limited. However, since too high a proportions of this catalyst results in too low proportions of the catalyst having SI of 30 or higher and below 40 and of the catalyst having a SI of lower than 30, the upper limit of the proportion of the catalyst having a SI of 40 or higher is preferably 50% by volume.

The packing proportion of the catalyst having a SI of 40 or higher is preferably in a range of from 10% to a certain volume percent which is allowed to satisfy the above equation even after increasing the partial hydrogen pressure (X in the above equation) and decreasing the sulfur content of feedstock oil (Y in the above equation).

More specifically, the relationship with hydrogen pressure (X) is as follows. At higher hydrogen pressure, hydroconversion activity increases, so that the charge rate can be increased, whereby even a lower quality heavy oil containing a larger amount of metals can be processed. In this case, the catalyst system can be formulated to maintain high deactivation stability through increasing the proportion of the catalyst having a SI of 40 or higher.

The relationship with the sulfur content (Y) of the product oil is as follows. In the case where the sulfur content in a product is to be reduced, it is necessary to lower the charge rate, or to change the feedstock to another heavy oil containing a smaller amount of metals and having good reactivity with hydrogen. Therefore, even if the proportion of the catalyst having a SI of 40 or higher is reduced, the high deactivation stability of the catalyst system can be maintained.

The packing proportions of the catalyst having a SI of 30 or higher and below 40 and the catalyst having a SI of lower than 30, which are used together with the catalyst having a SI of 40 or higher, are at least 20% by volume and at least 30% by volume, respectively.

The reasons for this are as follows. If the proportion of the catalyst having a SI of 30 or higher and below 40 is lower than 20% by volume, not only is sufficient desulfurization activity not exhibited, but also the consistency of desulfurization activity is lost in the latter stage of the operation, resulting in a shortened catalyst life. If the proportion of the catalyst having a SI of lower than 30 is below 30% by volume, the desired desulfurization activity is not obtained, and one must reduce the charge rate.

The upper limit of each of the packing proportions of the catalyst having a SI of 30 or higher and below 40 and the catalyst having a SI of lower than 30 is not particularly limited. However, too high proportions of either catalyst result in too low proportions of the catalyst having a SI of 40 or higher and also in too low proportions of the other of the catalyst having a SI of lower than 30 and the catalyst having a SI of 30 or higher and below 40. It is therefore preferred that the upper limit of the catalyst having a SI of 30 or higher and below 40 be 60% by volume and that of the catalyst having a SI of lower than 30 be 70% by volume.

It is desirable in the present invention that the catalyst having a SI of 40 or higher contains two metals nickel and molybdenum as the active metals thereof and the catalyst having a SI of lower than 40 contains the three metals nickel, cobalt, and molybdenum, the two metals nickel and molybdenum, or the two metals cobalt and molybdenum as the active metals thereof, with these catalysts being packed and used in such a manner that the cobalt/nickel weight ratio in the whole catalyst system is in the range of from 0 to 2, preferably from 0 to 1, in terms of cobalt oxide/nickel oxide ratio.

The reason for this is that if the cobalt/nickel weight ratio in the whole catalyst system is higher than 2, not only is the consistency of desulfurization activity lost during the middle stage of operation but also a high degree of hydrocracking cannot be obtained in a stable manner, although hydrogenation ability increases.

The whole catalyst system has a cobalt/nickel weight ratio of 0 in the case where neither the catalyst having a SI of 40 or higher nor the catalysts having a SI of lower than 40 contain cobalt, that is, in the case where the whole catalyst system does not contain cobalt.

Keeping the cobalt/nickel weight ratio at such a value, a catalyst combination system for hydroconversion which has both higher consistent desulfurization activity and high hydrocracking activity can be formed.

It is also desirable that the catalysts having a SI of lower than 40 are packed and used in such a manner that in the packed catalysts the cobalt/nickel weight ratio in any catalyst is not higher than that of the adjacent catalyst disposed on the side toward the outlet of the reactor.

The reason for this is that catalyst systems in which the cobalt/nickel weight ratio in any of the catalysts having a SI of lower than 40 is higher than that of the adjacent catalyst of those catalysts which are disposed on the side toward the outlet of the reactor have failed to consistently maintain high desulfurization activity after the initial stage of operation, which finally reduces catalyst life.

Packing the catalysts in such a manner, a catalyst system for hydroconversion which has both even higher desulfurization activity with consistency and high hydrocracking activity can be formed.

The catalysts for use in the present invention which have the desired SI can be obtained by strictly controlling catalyst preparation conditions. It should, however, be noted that even if only physical properties of catalysts, e.g., pore size distribution and pore volume, or the like are controlled, catalysts having the desired SI cannot be obtained.

Hitherto, catalysts have been classified by physical properties such as pore size distribution and pore volume to design catalyst combinations. However, catalyst combinations have often been improperly designed with respect to such physical properties as pore volume, pore size distribution, and pore diameter, and the characteristics of the alumina carrier or of the catalyst itself on deactivation have been insufficiently taken in account. As a result, the conventional catalyst systems, although having high initial desulfurization activity, have poor deactivation stability and cannot fully exhibit desulfurization activity.

In contrast, SI in the present invention is a factor which indicates the tendency of the catalyst to deactivate and which is defined by various physical properties of the catalyst; this index is directly determined through reaction, unlike a mere physical property.

In the present invention, catalysts classified by the thus-defined SI are used in combination in a given manner. As a result, a catalyst system having consistently good activity can be obtained.

Methods for producing the catalysts are described below in relation to SI, but these methods should not be construed as limiting the scope of the invention.

Ordinary methods may be used to prepare the catalysts.

The alumina carrier in the present invention may be prepared through neutralizing a solution of sodium aluminate with a base such as an ammonia solution or an aluminum salt solution, e.g., aluminum sulfate or aluminum nitrate, and treating the resulting gel through ordinary treatments such as, e.g., washing, aging with heating, first drying, molding, second drying, and calcining.

A catalyst having the desired SI may be obtained while the pH, concentration, temperature, or other conditions are controlled at the time when the precipitant (or neutralizing agent) is added to cause gelation.

In particular, catalysts having a high SI can be obtained by increasing the pH on the alkali side at the time of precipitation. This method tends to result in a larger pore diameter and larger pore volume.

The pore structure of the alumina can be controlled where the temperature or method for the first drying of alumina gel after aging with heating is changed. This technique may also be used for SI control.

For example, conducting the first drying at a lower temperature or drying the gel only by thorough filtration with minimal heating gives catalyst with a higher SI.

The adjustment of SI is also possible where the pressure is adjusted in the molding of an alumina carrier or of an alumina carrier containing metal components having hydroconversion activity (i.e., metals of Group VI and VIII in the Periodic Table).

Specifically, higher pressure in molding results in a lower SI and tends to result in smaller pore volume.

For incorporating active metals onto an alumina carrier, ordinary methods may be used.

For example, use may be made of a method in which an alumina carrier is brought into contact with a solution containing metal components having hydroconversion activity to be loaded onto the carrier. This method may, for example, be accomplished by impregnating the metal components from the solution onto the alumina carrier immersed therein.

In the case of loading the carrier with two or more metal components having hydroconversion activity, the sequence of loading these metal components is not particularly limited.

The amounts of active metals are preferably such that the amount of a metal selected from the transition metals of Group VI in the Periodic Table is about from 0.5 to 7% by weight in terms of the metal oxide based on the amount of the whole catalyst, while the amount of a metal selected from the transition metals of Group VIII in the Periodic Table is about from 7 to 17% by weight in terms of the metal oxide based on the amount of the whole catalyst.

If the amount of the active metal decreases, desulfurization activity and other activities are reduced, but SI tends to be increased.

On the other hand, if the amount of the active metal increases, desulfurization activity and other activities are enhanced, but SI tends to be reduced.

After the incorporation of active metals, the carrier is dried at a temperature of from room temperature to about 150° C., preferably about from 100° to 120° C., for about 5 hours or more, preferably about from 12 to 24 hours.

Calcination is carried out through heating the resulting carrier at a temperature of about from 350° to 600° C., preferably about from 400° to 550° C., for about 3 hours or more, preferably about from 12 to 24 hours.

Catalysts thus prepared are examined for SI by the method described hereinabove, and classified.

In the catalysts having any SI, the active metal components contained therein mostly turn into sulfides upon a pre-sulfurization procedure prior to the hydroconversion of a heavy hydrocarbon oil. During hydroconversion also, the active metal components partly or entirely turn into sulfides due to the sulfur contained in the heavy hydrocarbon oil.

The heavy hydrocarbon oil processed in the present invention undergoes hydrodesulfurization, hydrodenitrogenation, hydrodemetallization, hydrocracking, etc., upon contact with at least three catalyst beds.

Heavy hydrocarbon oils having any properties may be processed according to the present invention. Even a low-quality heavy oil having a carbon residue content of 5% by weight or higher and containing nickel, vanadium, iron, etc., in a total amount of about 20 ppm by weight or larger can be processed satisfactorily.

Appropriate hydroconversion conditions for use in the present invention include a temperature of from about 250° to 500° C., preferably from about 300° to 450° C., a hydrogen/oil ratio of from about 500 to 3,000 NL/L, a partial hydrogen pressure of from about 25 to 190 kg/cm$^2$G, preferably from about 80 to 170 kg/cm$^2$G, and an LHSV of from about 0.05 to 1 h$^{-1}$, preferably from about 0.1 to 0.5 h$^{-1}$.

Precise hydroconversion conditions depend on the desired degree of reaction, etc.

The present invention will be illustrated in greater detail by reference to the following Examples, but the invention should not be construed as being limited thereto.

(Catalyst Preparation Example 1)

A catalyst was prepared according to a process consisting of the steps shown in FIG. 1.

In step (13), molybdenum and nickel employed as active metals were deposited onto the carrier in amounts of 15% by weight and 5% by weight, respectively, in terms of metal oxide based on the whole amount of the catalyst (Catalyst A).

(Catalyst Preparation Example 2)

A catalyst was prepared according to a process consisting of the same steps as shown in FIG. 1, except that steps (5) to (8) were proceeded twice.

In step (13), molybdenum and nickel employed as active metals were deposited onto the carrier in amounts of 12% by weight and 4% by weight, respectively, in terms of metal oxide based on the whole amount of the catalyst (Catalyst B).

(Catalyst Preparation Example 3)

A catalyst was prepared according to a process consisting of the same steps as shown in FIG. 1, except that the aging in step (5) was performed for 20 hours and that steps (5) to (8) were proceeded twice.

In step (13), molybdenum and nickel employed as active metals were deposited onto the carrier in amounts of 9% by weight and 2% by weight, respectively, in terms of metal oxide based on the whole amount of the catalyst (Catalyst C).

(Analysis of the Catalysts)

Properties of prepared Catalyst A to C are shown in Table 1.

The values of pore volume given in Table 1 were obtained through measurement with a mercury porosimeter at pressure of 4,225 kg/cm$^2$G.

The average pore diameters were determined from the relationships between the pressure in the mercury porosimeter in the range of from 0 to 4,225 kg/cm$^2$G and the amount of mercury absorbed by the catalyst (contact angle, 130°; surface tension, 470 dyne/cm).

The surface areas were determined by the BET method.

(Measurement of SI)

Properties of the Boscan crude used for SI measurement are shown in Table 2.

The measurement was made under conditions of a catalyst amount of 20 mL ("mL" means milliliter; the same applies hereinafter), a reaction temperature of 395° C., a partial hydrogen pressure of 105 kg/cm$^2$G, an LHSV of 0.5 h$^{-1}$, and a hydrogen/oil ratio of 1,780 NL/L.

The results of the measurement of SI of Catalyst A to C are shown in Table 1.

<Hydroconversion Examples>

EXAMPLE 1

The catalyst combination used here is shown in Table 3.

The reaction was carried out in such a manner that the decrease in catalytic activity was compensated by increasing the reaction temperature so as to yield a reaction product in which the hydroconverted residual oil having a boiling point of 343° C. or higher had a sulfur content of 0.3% by weight or lower.

The reaction conditions included a catalyst amount of 250 mL, a hydrogen pressure of 100 kg/cm$^2$G, an LHSV of 0.3 h$^{-1}$, a hydrogen/oil ratio of 1,000 NL/L, and reaction temperatures of 360° to 400° C.

The feedstock oil used was an atmospheric distillation residue of Arabian Light crude. Properties of this feedstock oil are shown in Table 2.

The change in reaction temperature and average degree of hydrocracking until the reaction temperature reached the upper limit (hereinafter simply referred to as "average degree of hydrocracking") in the above reaction are indicated as Example 1 in FIG. 2 and Table 3, respectively.

The average degree of cracking, which is expressed in terms of wt %, is the arithmetic mean of the degrees of hydrocracking for individual operation days, while the degree of hydrocracking for each operation day being obtained from dividing the weight of the light fractions of the product oil which have a boiling point of 343° C. or lower with the weight of the feedstock oil.

Figure 2:
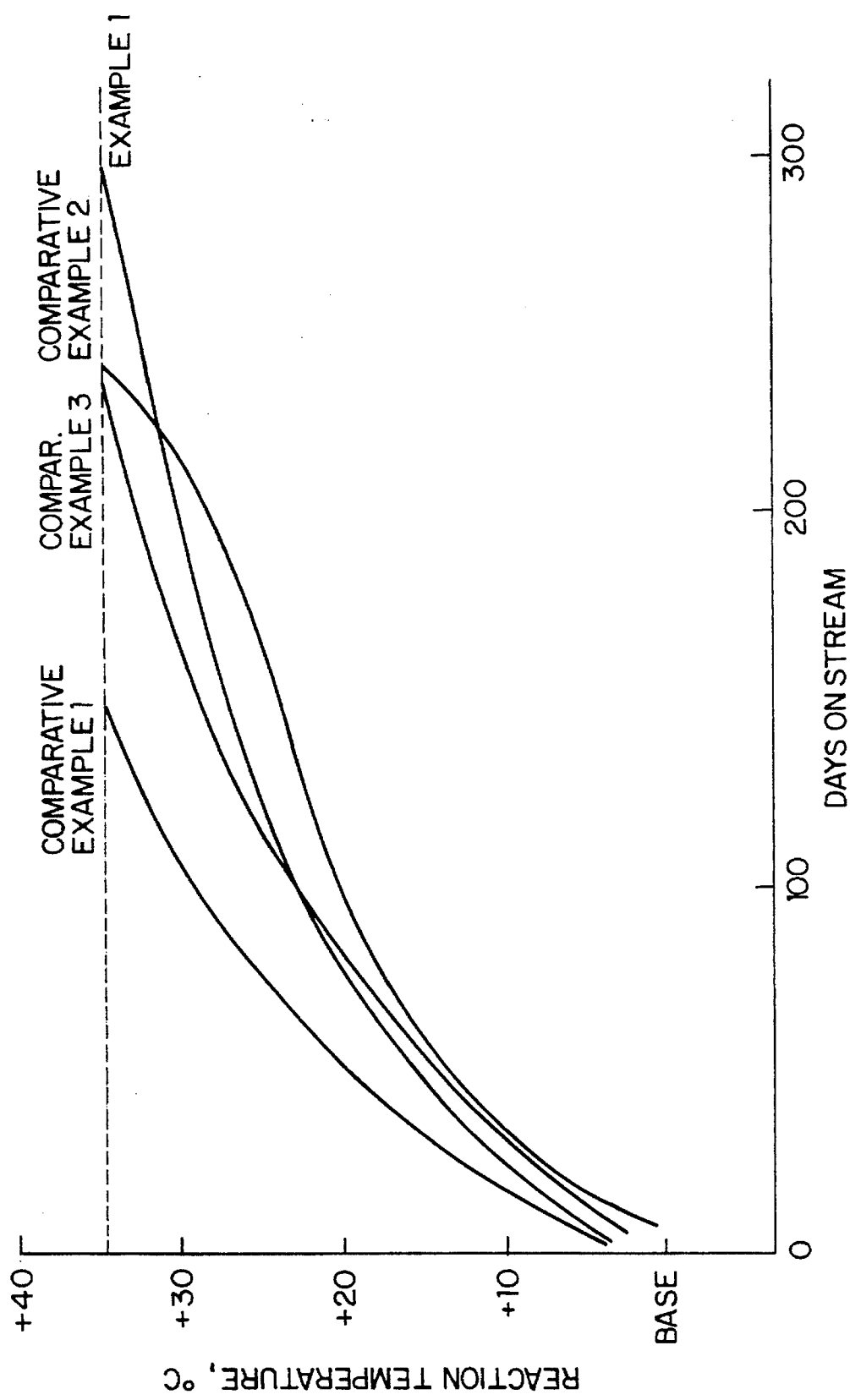
FIG. 2 is a graph showing changes of reaction temperature with time (days on stream) in Example 1 of the present invention and in Comparative Examples 1 to 3.

FIG. 2 illustrates that in the hydroconversion of Example 1, stable operation was available over 300 days or more. Namely, the time required for the necessary reaction temperature to reach the upper limit (the critical temperature at which the operation may become impossible due to the coking of catalyst beds, etc., and which was 395° C. in this Example) was 300 days or more in Example 1. (Hereinafter, the number of days required for the reaction temperature to reach this upper limit is referred to as "catalyst life.")

As shown in Table 3, the average degree of hydrocracking was as high as 24%.

COMPARATIVE EXAMPLES 1 TO 3

The catalyst combinations used here are shown in Table 3.

The reaction mode and the other conditions were the same as in Example 1.

The catalyst combinations of Comparative Examples 1, 2, and 3, although arranged in a descending order of SI, did not contain a catalyst having SI of 30 or higher and below 40, a catalyst having SI of 40 or higher, and a catalyst having SI of 30 or higher and below 40, respectively, as shown in Table 3.

The changes in reaction temperature and catalyst life and average degree of hydrocracking are indicated as Comparative Examples 1, 2, and 3 in FIG. 2 and Table 3, respectively.

As shown in FIG. 2 and Table 3, as compared with the catalyst system of Example 1, the catalyst system of Comparative Example 1 had a catalyst life as considerably short as 152 days, that of Comparative Example 2 had a catalyst life as short as 235 days and average degree of hydrocracking as low as 19%, and that of Comparative Example 3 had catalyst life as short as 234 days.

The average degrees of hydrocracking in Comparative Examples 1 and 3 were 21% and 22%, respectively.

(Catalyst Preparation Example 4)

A catalyst was prepared according to a process consisting of the same steps as shown in FIG. 1, except that drying by vacuum filtration was conducted in place of the spray drying in step (9). In step (13), molybdenum and nickel employed as active metals were deposited onto the carrier in amounts of 15% by weight and 5% by weight, respectively, in terms of metal oxide based on the whole amount of the catalyst (Catalyst D).

The result of the analysis of Catalyst D and the result of SI measurement are shown in Table 1.

<Hydroconversion Examples>

EXAMPLE 2

The catalyst combination used here is shown in Table 4.

The reaction mode was the same as in Example 1. The reaction conditions included a hydrogen pressure of 150 kg/cm$^2$G, an LHSV of 0.2 h$^{-1}$, and temperatures of 350° to 410° C., and the other reaction conditions were the same as in Example 1.

An atmospheric distillation residue of Kuwait crude was used as feedstock oil. Properties of the feedstock oil are shown in Table 2.

Figure 3:
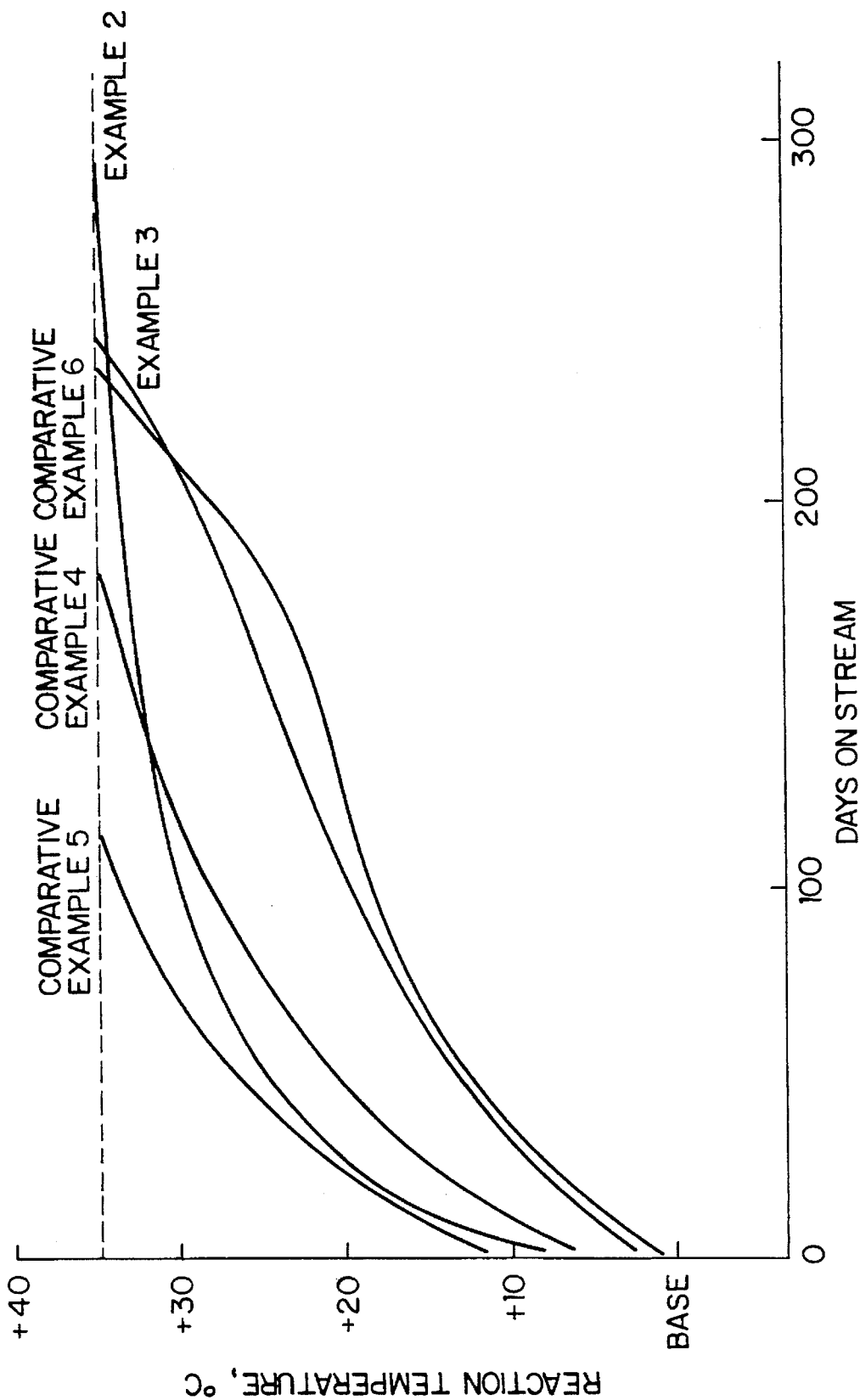
FIG. 3 is a graph showing changes of reaction temperature with time (days on stream) in Examples 2 and 3 of the present invention and in Comparative Examples 4 to 6.

The changes in reaction temperature and catalyst life and average degree of hydrocracking in the above reaction are indicated as Example 2 in FIG. 3 and Table 4, respectively.

As shown in FIG. 3 and Table 4, the catalyst system of Example 2 had catalyst life as long as 300 days or more and average degree of hydrocracking as high as 24%.

COMPARATIVE EXAMPLES 4 TO 6 AND EXAMPLE 3

The catalyst combinations used here are shown in Table 4.

The reaction mode and the other conditions were the same as in Example 2.

The catalyst combinations of Comparative Examples 4, 5, and 6, although arranged in a descending order of SI, did not contain a catalyst having SI of 30 or higher and below 40, a catalyst having SI of lower than 30, and a catalyst having SI of 40 or higher, respectively, as shown in Table 4.

The catalyst system of Example 3 satisfied the essential requirements of the present invention, but the proportion (vol %) of the catalyst having SI of 40 or higher was outside the range defined by the equation described hereinabove.

The changes in reaction temperature and catalyst life and average degree of hydrocracking are indicated as Comparative Examples 4, 5, and 6 and Example 3 in FIG. 3 and Table 4, respectively.

As shown in FIG. 3 and Table 4, as compared with the catalyst system of Example 2, the catalyst systems of Comparative Examples 4 and 5 had catalyst lives as considerably short as 195 days and 112 days, respectively, and the catalyst system of Comparative Example 6 had catalyst life as short as 230 days and average degree of hydrocracking as low as 18%.

A comparison between Example 2 and Example 3 shows that the catalyst system of Example 2, which satisfied the requirement defined by the above equation, was superior in catalyst life and average degree of hydrocracking to the catalyst system of Example 3, which did not satisfy that requirement.

The average degree of hydrocracking in both of Comparative Examples 4 and 5 was 20%.

(Catalyst Preparation Example 5)

A catalyst was prepared according to a process consisting of the steps shown in FIG. 1. In step (13), ammonium paramolybdate, nickel nitrate, and cobalt nitrate were used and molybdenum, nickel, and cobalt were deposited onto the carrier in amounts of 15% by weight, 2.5% by weight, and 2.5% by weight, respectively, in terms of metal oxide based on the whole amount of the catalyst (Catalyst E).

The result of the analysis of Catalyst E and the result of SI measurement are shown in Table 1.

(Catalyst Preparation Example 6)

A catalyst was prepared according to a process consisting of the steps shown in FIG. 1. In step (13), ammonium paramolybdate and cobalt nitrate were used and molybdenum and cobalt were deposited onto the carrier in amounts of 15% by weight and 5% by weight, respectively, in terms of metal oxide based on the whole amount of the catalyst (Catalyst F).

The result of the analysis of Catalyst F and the result of SI measurement are shown in Table 1.

<Hydroconversion Examples>

EXAMPLES 4 AND 5

The catalyst combinations used here are shown in Table 5.

The reaction conditions included a hydrogen pressure of 110 kg/cm$^2$G and an LHSV of 0.33 h$^{-1}$, and the other reaction conditions and the reaction mode and feedstock oil were the same as in Example 1.

Figure 4:
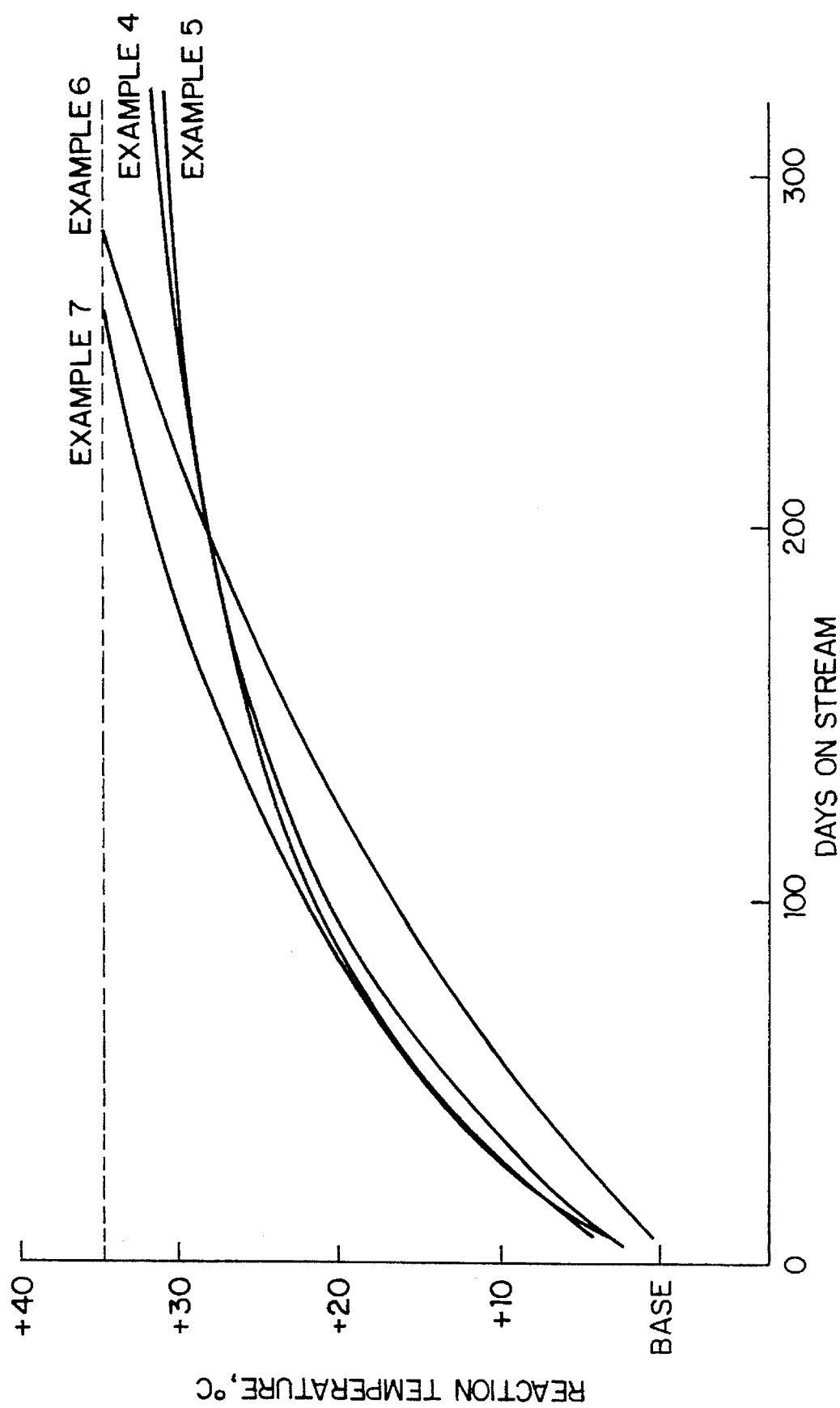
FIG. 4 is a graph showing changes of reaction temperature with time (days on stream) in Examples 4 to 7 of the present invention.

The changes in reaction temperature and catalyst life and average degree of hydrocracking in the above reactions are indicated as Examples 4 and 5 in FIG. 4 and Table 5, respectively.

As shown in FIG. 4 and Table 5, the catalyst systems of Examples 4 and 5 each had catalyst life as long as 300 days or more and average degree of hydrocracking as high as 22%. Even on the 300th day of operation the reaction temperature was still considerably lower than the upper limit.

EXAMPLES 6 AND 7

The catalyst combinations used here are shown in Table 5.

The reaction mode and the other conditions were the same as in Examples 4 and 5.

The catalyst systems of Examples 6 and 7 satisfied the requirement concerning SI as shown in Table 5. In Example 6, however, the catalysts having SI of lower than 40, which contained cobalt and nickel as active metals, had a cobalt/nickel weight ratio as high as 3.0 in terms of cobalt oxide/nickel oxide ratio.

In Example 7, the catalysts having SI of lower than 40, which contained cobalt and nickel as active metals, had a part where the cobalt/nickel weight ratio decreased when the catalyst system was viewed from the inlet to the outlet of the reactor (the cobalt/nickel ratio in Catalyst F being infinite and that in Catalyst A being zero).

The changes in reaction temperature and catalyst life and average degree of hydrocracking are indicated as Examples 6 and 7 in FIG. 4 and Table 5, respectively.

As shown in FIG. 4 and Table 5, the catalyst system of Example 6 had catalyst life of 300 days but had average degree of hydrocracking of 20%, which was lower than the degree of hydrocracking attained in Examples 4 and 5. The catalyst system of Example 7 had catalyst life of 285 days, which was shorter than the catalyst life attained in Examples 4 and 5.

(Catalyst Preparation Example 7)

A catalyst was prepared according to a process consisting of the same steps as shown in FIG. 1, except that water content adjustment by filtration was conducted in place of the spray drying and water content adjustment in step (9), and that in step (13), ammonium paramolybdate, nickel nitrate, and cobalt nitrate were used and molybdenum, nickel, and cobalt were deposited onto the carrier in amounts of 15% by weight, 2.5% by weight, and 2.5% by weight, respectively, in terms of metal oxide based on the whole amount of the catalyst (Catalyst G).

The result of the analysis of Catalyst G and the result of SI measurement are shown in Table 1.

<Hydroconversion Examples>

EXAMPLE 8

The catalyst combination used here is shown in Table 6.

The reaction mode, reaction conditions, and feedstock oil were the same as in Example 2, except that the LHSV was changed to 0.25 $h^{-1}$.

Figure 5:
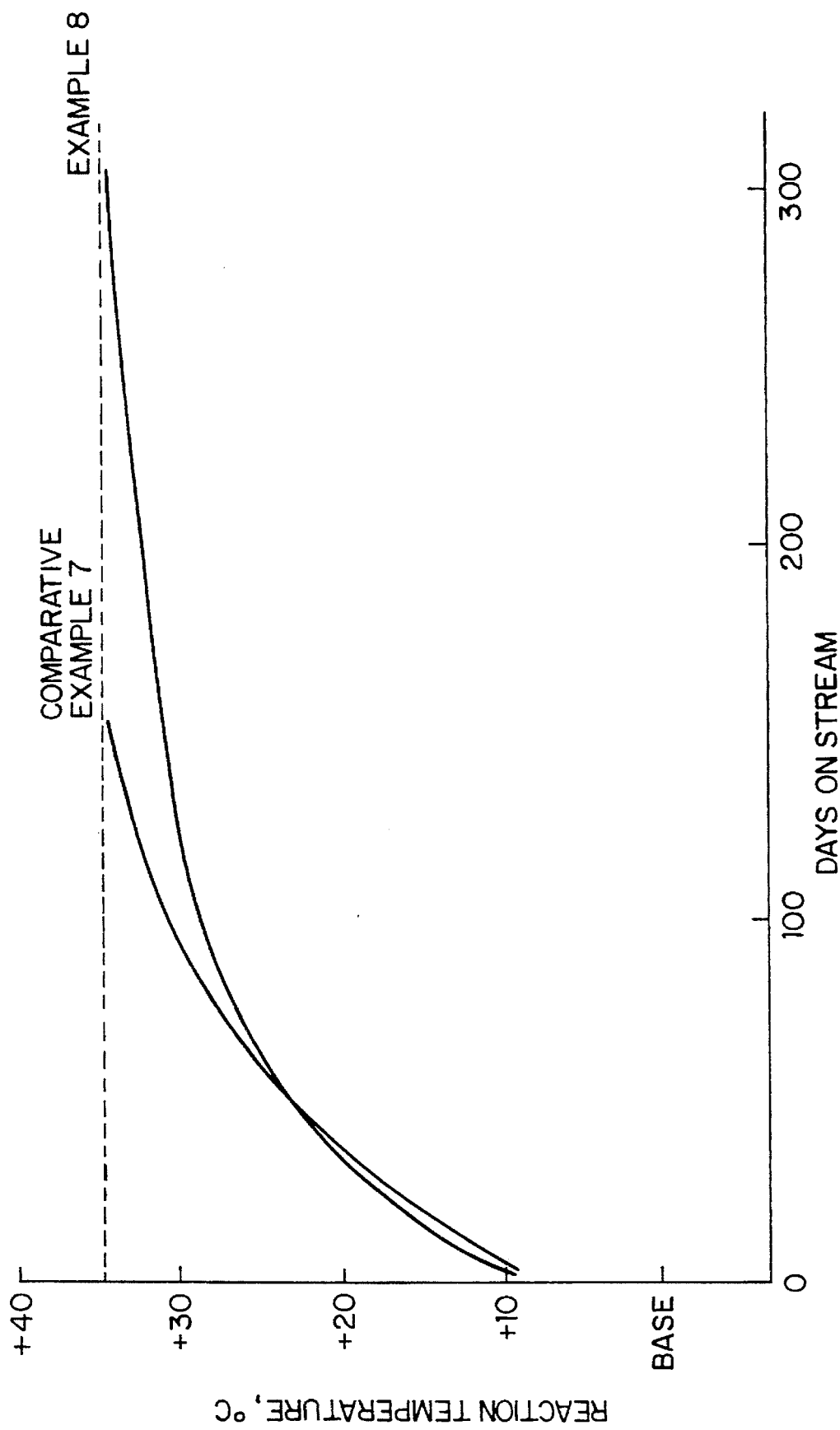
FIG. 5 is a graph showing changes of reaction temperature with time (days on stream) in Example 8 of the present invention and in Comparative Example 7.

The changes in reaction temperature and catalyst life and average degree of hydrocracking in the above reaction were indicated as Example 8 in FIG. 5 and Table 6, respectively.

As shown in FIG. 5 and Table 6, the catalyst system of Example 8 had catalyst life of 300 days or more and degree of hydrocracking as high as 25%.

COMPARATIVE EXAMPLE 7

The catalyst combination used here is shown in Table 6.

The reaction mode and the other conditions were the same as in Example 8.

In Comparative Example 7, the catalyst having SI of 30 or higher and below 40 and the catalyst having SI of lower than 30 were packed in the reversed order as shown in Table 6.

The changes in reaction temperature and catalyst life and average degree of hydrocracking are indicated as Comparative Example 7 in FIG. 5 and Table 6, respectively.

As shown in FIG. 5 and Table 6, the catalyst system of Comparative Example 7 had catalyst life of 149 days, which was far shorter than the catalyst life attained in Example 8.

The average degree of hydrocracking in Comparative Example 7 was 20%.

EXAMPLE 9

The catalyst combination used here is shown in Table 7.

The reaction was carried out in such a manner that the decrease in catalytic activity was compensated by increasing the reaction temperature so as to yield a reaction product in which the residual oil having a boiling point of 343° C. or higher had a sulfur content of 0.1% by weight or lower.

The reaction conditions included a hydrogen pressure of 170 kg/cm$^2$G and an LHSV of 0.16 $h^{-1}$, and an atmospheric distillation residue of Arabian Light crude was used as feedstock oil. The other conditions were the same as in Example 2.

Figure 6:
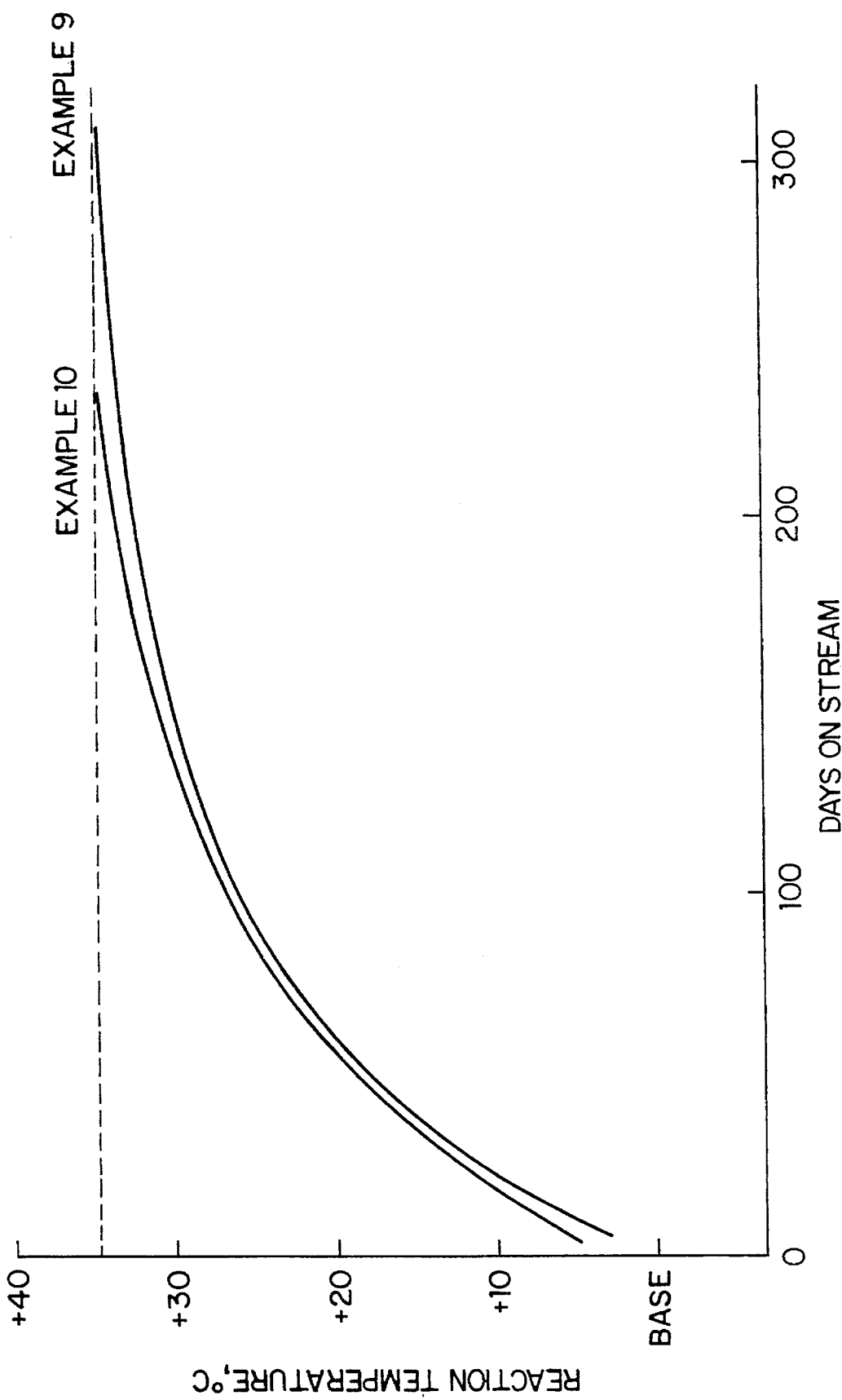
FIG. 6 is a graph showing changes of reaction temperature with time (days on stream) in Examples 9 and 10 of the present invention.

The changes in reaction temperature and catalyst life and average degree of hydrocracking in the above reaction are indicated as Example 9 in FIG. 6 and Table 7, respectively.

As shown in FIG. 6 and Table 7, the catalyst system of Example 9 had catalyst life of 300 days or more and degree of hydrocracking as high as 22%.

EXAMPLE 10

The catalyst combination used here is shown in Table 7.

The reaction mode and the other conditions were the same as in Example 9.

Similar to the catalyst system of Example 3, the catalyst system of Example 10 satisfied the essential requirements of the present invention but the proportion (vol %) of the catalyst having SI of 40 or higher was outside the range defined by the equation described hereinabove.

The changes in reaction temperature and catalyst life and average degree of hydrocracking are indicated as Example 10 in FIG. 6 and Table 7, respectively.

As apparent from FIG. 6 and Table 7, a comparison between Example 9 and Example 10 shows that the catalyst system of Example 9, which satisfied the requirement defined by the above equation, was superior in catalyst life and average degree of hydrocracking to the catalyst system of Example 10, which did not satisfy that requirement.

The average degree of hydrocracking in Example 10 was 20%.

TABLE 1

| Catalyst | Catalyst A | Catalyst B | Catalyst C | Catalyst D |
| --- | --- | --- | --- | --- |
| Metal Component: | | | | |
| NiO (wt %) | 4.9 | 4.1 | 2.0 | 5.1 |
| CoO (wt %) | 0 | 0 | 0 | 0 |
| MoO$_3$ (wt %) | 15.2 | 11.9 | 9.1 | 15.1 |
| Physical Properties: | | | | |
| Surface area (m$^2$/g) | 229 | 184 | 120 | 231 |
| Pore volume (mL/g) | 0.57 | 0.62 | 0.67 | 0.57 |
| Average pore diameter Å | 84 | 120 | 165 | 85 |
| SI: | 25 | 36 | 45 | 34 |

| Catalyst | Catalyst E | Catalyst F | Catalyst G |
| --- | --- | --- | --- |
| Metal Component: | | | |
| NiO (wt %) | 2.4 | 0 | 2.5 |
| CoO (wt %) | 2.6 | 5.1 | 2.6 |
| MoO$_3$ (wt %) | 15.0 | 15.0 | 15.0 |
| Physical Properties: | | | |
| Surface area (m$^2$/g) | 230 | 232 | 232 |
| Pore volume (mL/g) | 0.56 | 0.56 | 0.57 |
| Average pore diameter Å | 85 | 86 | 86 |
| SI: | 23 | 24 | 35 |

TABLE 2

| Feedstock Oil | Boscan crude | Arabian Light atmospheric distillation residue | Kuwait atmospheric distillation residue |
| --- | --- | --- | --- |
| Specific Gravity | 1.0101 | 0.9472 | 0.9746 |

TABLE 2-continued

| Feedstock Oil | Boscan crude | Arabian Light atmospheric distillation residue | Kuwait atmospheric distillation residue |
|---|---|---|---|
| (15/4° C.) | | | |
| Sulfur Content (wt %) | 4.56 | 2.97 | 3.89 |
| Kinematic Viscosity (50° C., cSt) | 42000 | 138.6 | 965.0 |
| Conradson Carbon Residue Content (wt %) | 16.1 | 7.88 | 12.4 |
| Asphaltene Content (wt %) | 12.6 | 1.89 | 4.41 |
| Metal content (wppm) | 1320 | 23 | 73 |
| 343° C. + Fraction (wt %) | | 92.2 | 97.1 |

TABLE 3

| | Example 1 | Comp. Example 1 | Comp. Example 2 | Comp. Example 3 |
|---|---|---|---|---|
| Sequence of Packing | C → B → A | C → A | B → A | C → A |
| Packing Ratio | 10 20 70 | 30 70 | 30 70 | 10 90 |
| Catalyst Life (days) | ≧300 | 152 | 235 | 234 |
| Average Degree of Hydrocracking % | 24 | 21 | 19 | 22 |

Note) The sequence of packing is from the reactor inlet. The packing ratio is expressed by volume %.

TABLE 4

| | Example 2 | Example 3 |
|---|---|---|
| Sequence of Packing | C → D → A | C → D → A |
| Packing Ratio | 35 30 35 | 10 25 65 |
| Catalyst Life (days) | ≧300 | 249 |
| Average Degree of Hydrocracking (%) | 24 | 19 |

| | Comp. Example 4 | Comp. Example 5 | Comp. Example 6 |
|---|---|---|---|
| Sequence of Packing | C → A | C → D | D → A |
| Packing Ratio | 35 65 | 35 65 | 35 65 |
| Catalyst Life (days) | 195 | 112 | 230 |
| Average Degree of Hydrocracking (%) | 20 | 20 | 18 |

Note) The sequence of packing and the packing ratio are defined in the same manner as in Table 3.

TABLE 5

| | Example 4 | Example 5 | Example 6 | Example 7 |
|---|---|---|---|---|
| Sequence of Packing | C → B → E | C→ B→ A→ F | C → B → F | C→ B→ F→ A |
| Packing Ratio | 15 20 65 | 15 20 35 30 | 15 20 65 | 15 20 30 35 |
| Catalyst Life (days) | ≧300 | ≧300 | 300 | 285 |
| Average Degree of Hydrocracking (%) | 22 | 22 | 20 | 23 |

Note) The sequence of packing and the packing ratio are defined in the same manner as in Table 3.

TABLE 6

| | Example 8 | Comp. Example 7 |
|---|---|---|
| Sequence of Packing | C → G → E | C → E → G |
| Packing Ratio | 35 35 30 | 35 35 30 |
| Catalyst Life (days) | ≧300 | 149 |
| Average Degree of Hydrocracking (%) | 25 | 20 |

Note) The sequence of packing and the packing ratio are defined in the same manner as in Table 3.

TABLE 7

| | Example 9 | Example 10 |
|---|---|---|
| Sequence of Packing | C → D → A | C → D → A |
| Packing Ratio | 15 50 35 | 35 30 35 |
| Catalyst Life (days) | ≧300 | 240 |
| Average Degree of Hydrocracking (%) | 22 | 20 |

Note) The sequence of packing and the packing ratio are defined in the same manner as in Table 3.

According to the present invention, through using three or more catalysts having different SI in a specific manner, a catalyst system for hydroconversion can be constituted which not only exhibits high desulfurization activity with consistency but also shows high hydrocracking activity due to the synergistic effect of these catalysts.

In the process of the present invention, in which this catalyst system is used, heavy hydrocarbon oils which have been difficult to be processed by conventional hydroconversion techniques can be satisfactorily hydroconverted (hydrodesulfurized, hydrocracked, hydrodemetallized, etc.) over long period of time.

While the invention has been described in detail and with reference to specific embodiments thereof, it will be apparent to one skilled in the art that various changes and modifications can be made therein without departing from the spirit and scope thereof.

What is claimed is:

1. A process for hydroconverting a heavy hydrocarbon oil in a reactor under high-temperature and high-pressure conditions, wherein said hydroconversion is carried out using at least three desulfurization catalysts which each contain as active metals transition metals of Group VI and VIII in the Periodic Table supported on an alumina carrier and which have different stability indices of 40 or higher, 30 or higher and below 40, and lower than 30, respectively, and wherein said at least three catalysts are packed into the reactor in a descending order of stability index from the inlet to the outlet of the reactor, with the proportion of the catalyst having the stability index of 40 or higher being at least 10% by volume, that of the catalyst having the stability index of 30 or higher and below 40 being at least 20% by volume, and that of the catalyst having the stability index of lower than 30 being at least 30% by volume, wherein said hydroconverting is conducted at a temperature of from about 250° to 500° C. a hydrogen/oil ratio of from about 500 to 3,000 NL/L, a hydrogen partial pressure of from about 25 to 190 kg/cm²G and an LSHV from about 0.05 to 1 h⁻¹.

2. The process according to claim 1 wherein the proportion by volume, V as %, of the catalyst having a stability index of 40 or higher is in the range defined by the equation:

$$10(0.63X-56)Y/3-10 < V < 10(0.63X-56)Y/3+10$$

wherein X is the partial pressure in kg/cm²G of the hydrogen fed for the reaction and Y is the sulfur content in wt % of the product oil.

3. The process according to claim 1 wherein the catalyst having the stability index of 40 or higher contains a combination of nickel and molybdenum as active metals and the catalysts having the stability index of lower than 40 contain as active metals any of a combination of nickel, cobalt, and molybdenum, a combination of nickel and molybdenum, and a combination of cobalt and molybdenum, with the catalysts being packed so that the cobalt/nickel weight ratio in the whole catalyst system is from 0 to 2 in terms of the ratio of cobalt oxide/nickel oxide.

4. The process according to claim 2, wherein the catalyst having the stability index of 40 or higher contains a combination of nickel and molybdenum as active metals and the catalysts having the stability index of lower than 40 contain as active metals any of a combination of nickel, cobalt, and molybdenum, a combination of nickel and molybdenum, and a combination of cobalt and molybdenum, with the catalysts being packed so that the cobalt/nickel weight ratio in the whole catalyst system is from 0 to 2 in terms of the ratio of cobalt oxide/nickel oxide.

5. The process according to any one of claims 1 to 4 wherein the catalysts having the stability index of lower than 40 are packed in such a manner that in the packed catalysts, the cobalt/nickel weight ratio in any catalyst is not higher than that of the adjacent catalyst disposed on the side toward the outlet of the reactor.

* * * * *